(12) United States Patent
Moisio et al.

(10) Patent No.: US 10,341,812 B2
(45) Date of Patent: Jul. 2, 2019

(54) METHODS AND APPARATUSES FOR RECONFIGURING A ROAMING MOBILE BASE STATION BASED UPON ITS LOCATION

(71) Applicant: Nokia Technologies Oy, Espoo (FI)

(72) Inventors: Martti Moisio, Klaukkala (FI); Mikko Uusitalo, Helsinki (FI); Zexian Li, Espoo (FI); Osman Yilmaz, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 1 day.

(21) Appl. No.: 14/896,282

(22) PCT Filed: Jun. 13, 2013

(86) PCT No.: PCT/US2013/045675
§ 371 (c)(1),
(2) Date: Dec. 4, 2015

(87) PCT Pub. No.: WO2014/200493
PCT Pub. Date: Dec. 18, 2014

(65) Prior Publication Data
US 2016/0150576 A1  May 26, 2016

(51) Int. Cl.
*H04W 4/02* (2018.01)
*H04W 24/02* (2009.01)
(Continued)

(52) U.S. Cl.
CPC ........... *H04W 4/023* (2013.01); *H04W 24/02* (2013.01); *H04W 76/10* (2018.02); *H04B 1/0003* (2013.01);
(Continued)

(58) Field of Classification Search
CPC ............................. H04W 76/02; H04W 4/023
See application file for complete search history.

(56) References Cited

U.S. PATENT DOCUMENTS 7,187,927 B1   3/2007 Mitchell
8,300,594 B1 * 10/2012 Bernier ................. H04W 48/10
                                                           370/331
(Continued)

FOREIGN PATENT DOCUMENTS

EP        1560451 A2 *  8/2005  ............ H04W 24/02

OTHER PUBLICATIONS

International Search Report and Written Opinion received for corresponding Patent Cooperation Treaty Application No. PCT/US2013/045675, dated Mar. 18, 2014, 16 pages.
(Continued)

*Primary Examiner* — Jamal Javaid
(74) *Attorney, Agent, or Firm* — Squire Patton Boggs (US) LLP (57) ABSTRACT

Methods, apparatuses, and computer program products for a mobile or roaming base station are described. An operating mode of a mobile base station is determined, based upon the mobile base station's current location and/or current mobility mode. The operating mode of the mobile base station is switched from a full base station functionality to a limited base station functionality, based upon the determining. A connection to a network is established by the mobile base station.

20 Claims, 6 Drawing Sheets

(51) Int. Cl.
*H04W 76/10* (2018.01)
*H04B 1/00* (2006.01)
*H04W 84/00* (2009.01)
*H04W 84/04* (2009.01)
*H04W 88/08* (2009.01)

(52) U.S. Cl.
CPC ........ *H04W 84/005* (2013.01); *H04W 84/045* (2013.01); *H04W 84/047* (2013.01); *H04W 88/08* (2013.01)

(56) References Cited

U.S. PATENT DOCUMENTS

2007/0190934 A1* 8/2007 Kim .................. H04B 7/15557
455/7
2011/0092237 A1* 4/2011 Kato .................. H04W 64/003
455/507

OTHER PUBLICATIONS

Communication pursuant to Article 94(3) EPC dated Jan. 15, 2018 corresponding to European Patent Application No. 13733166.6.
European Office Action application No. 13 733 166.6 dated Oct. 11, 2018.

* cited by examiner

METHODS AND APPARATUSES FOR RECONFIGURING A ROAMING MOBILE BASE STATION BASED UPON ITS LOCATION

RELATED APPLICATION

This application was originally filed as Patent Cooperation Treaty Application No. PCT/US2013/045675 filed Jun. 13, 2013.

BACKGROUND

Field

Embodiments of the invention generally relate to wireless communication systems, such as, but not limited to, the Universal Mobile Telecommunications System (UMTS) Terrestrial Radio Access Network (UTRAN), Long Term Evolution (LTE) Evolved UTRAN (E-UTRAN), and/or LTE-Advanced (LTE-A). Some embodiments relate to a mobile or roaming base station.

Description of the Related Art

Universal Mobile Telecommunications System (UMTS) Terrestrial Radio Access Network (UTRAN) refers to a communications network including base stations, or Node Bs, and for example radio network controllers (RNC). UTRAN allows for connectivity between the user equipment (UE) and the core network. The RNC provides control functionalities for one or more Node Bs. The RNC and its corresponding Node Bs are called the Radio Network Subsystem (RNS). In case of E-UTRAN (enhanced UTRAN), no RNC exists and most of the RNC functionalities are contained in the eNodeB (evolved Node B, also called E-UTRAN Node B).

Long Term Evolution (LTE) or E-UTRAN refers to improvements of the UMTS through improved efficiency and services, lower costs, and use of new spectrum opportunities. In particular, LTE is a 3rd generation partnership project (3GPP) standard that provides for uplink peak rates of at least 50 megabits per second (Mbps) and downlink peak rates of at least 100 Mbps. LTE supports scalable carrier bandwidths from 20 MHz down to 1.4 MHz and supports both Frequency Division Duplexing (FDD) and Time Division Duplexing (TDD). Advantages of LTE are, for example, high throughput, low latency, FDD and TDD support in the same platform, an improved end-user experience, and a simple architecture resulting in low operating costs.

Further releases of 3GPP LTE (e.g., LTE Rel-11, LTE-Rel-12) are targeted towards future international mobile telecommunications advanced (IMT-A) systems, referred to herein for convenience simply as LTE-Advanced (LTE-A). LTE-A is directed toward extending and optimizing the 3GPP LTE radio access technologies. A goal of LTE-A is to provide significantly enhanced services by means of higher data rates and lower latency with reduced cost. LTE-A will be a more optimized radio system fulfilling the international telecommunication union-radio (ITU-R) requirements for IMT-Advanced while keeping the backward compatibility.

A moving network node or a group of such nodes can form a "moving network" that communicates with its environment, such as other fixed or mobile nodes that are inside or outside the moving entity. An example of a moving network is a vehicle or bus with advanced communication and networking capabilities. An objective of moving networks is to design corresponding solutions for backhaul, mobility, and interference management, as well as models and solutions for spectrum and network sharing.

SUMMARY

An embodiment is directed to a method in which an operating mode of a mobile base station is determined, based upon the mobile base station's current location and/or current mobility mode. The operating mode of the mobile base station is switched from a full base station functionality to a limited base station functionality, based upon the determining A connection to a network is established by the mobile base station.

Another embodiment is directed to an apparatus, comprising at least one processor and at least one memory containing computer program code. The at least one memory and the computer program code are configured with the at least one processor to cause the apparatus to at least determine an operating mode based on a current location and/or a current mobility mode, switch the operating mode from a full base station functionality to a limited base station functionality based on the determining an operating mode, and establish a connection to a network.

Another embodiment is directed to a computer program, embodied on a non-transitory computer readable medium. The computer program is configured to control a processor to perform a process. The process comprises determining an operating mode of a mobile base station based on the mobile base station's current location and/or current mobility mode, switching the operating mode of the mobile base station from a full base station functionality to a limited base station functionality based on the determining, and establishing a connection to a network by the mobile base station.

Another embodiment is directed to a method in which a transmission from a mobile base station is received by a user equipment, wherein the mobile base station is operating in a full base station capacity. Another transmission is received by the user equipment from the mobile base station when the mobile base station changes its current location and/or current mobility mode, wherein the mobile base station is operating in a limited base station capacity.

Another embodiment is directed to an apparatus, comprising at least one processor and at least one memory containing computer program code. The at least one memory and the computer program code are configured with the at least one processor to cause the apparatus to at least receive a transmission from a mobile base station, wherein the mobile base station is operating in a full base station capacity; and when the mobile base station changes its current location and/or current mobility mode, receive another transmission from the mobile base station, wherein the mobile base station is operating in a limited base station capacity.

Another embodiment is directed to a computer program, embodied on a non-transitory computer readable medium. The computer program is configured to control a processor to perform the following process. A transmission from a mobile base station is received by a user equipment, wherein the mobile base station is operating in a full base station capacity. Another transmission is received by the user equipment from the mobile base station when the mobile base station changes its current location and/or current mobility mode, wherein the mobile base station is operating in a limited base station capacity.

Another embodiment is directed to a system, comprising a mobile base station. The mobile base station is configured to operate in a full base station capacity when it is not moving or roaming, and it is configured to operate in a limited base station capacity when it is moving or roaming. The system also comprises one or more user equipments connected to the mobile base station.

BRIEF DESCRIPTION OF THE DRAWINGS

For proper understanding of the invention, reference should be made to the accompanying drawings, wherein.

DETAILED DESCRIPTION

It will be readily understood that the components of the invention, as generally described and illustrated in the figures herein, may be arranged and designed in a wide variety of different configurations. Thus, the following detailed description of embodiments of the invention, as represented in the attached figures, is not intended to limit the scope of the invention, but is merely representative of selected embodiments of the invention.

If desired, the different functions discussed below may be performed in a different order and/or concurrently with each other. Furthermore, if desired, one or more of the described functions may be optional or may be combined. As such, the following description should be considered as merely illustrative of the principles, teachings and embodiments of this invention, and not in limitation thereof.

In wireless telecommunications, roaming can be defined as the ability for a user to function in a serving network different from a home network, where a distinction is made between a home network and a visited network. In a traditional wireless network architecture, only mobile terminals or user equipment nodes moved within the network, via base stations between access points. Therefore, roaming was a concern just for the user equipment. However, as base stations become smaller and more mobile, they also have entered the roaming realm.

There are several problems related to mobile base stations. Their function within a network assumes a fixed position. Therefore, a roaming mobile base station will cause some issues, for example, interference. There are also regulatory infringement concerns. Roaming between operators with the same or different radio technologies is a problem, and there are cost-related issues when the mobile base station operates outside of its own network.

Certain embodiments of the invention provide a dual mode mobile base station (mBS). The dual mode mBS would operate as a fully functional base station when the mBS is not moving and is not roaming. The mBS functions as a local low-power enhanced Node B (eNB) according to the instructions received from other local eNBs and the network. With a local low-power eNB, it is still possible to have limited eNB functions running. Otherwise, the mBS operates in a relay mode. In an embodiment, the relay mode is implemented via a Type 2 relay node. As a result, interference and network planning issues can be avoided.

A Type 2 relay node has a direct communication link with a Node B base station, such as an eNB, to improve service quality and link capacity for a local user equipment (UE). For a LTE, as an example, a Type 2 relay node does not transmit a Common Reference Signal (CRS) or control information. Its main objective is to increase the overall system capacity by achieving multipath diversity and transmission gains for the local UE.

When a mBS is in a roaming mode, it can get operational parameters from the network with mutual agreement between a home network and a visitor network. It would function as a roaming local eNB with low-power if there is a power limitation. It can use subscriber information from the UEs, such as via a Subscriber Identity Module (SIM) card under it, or the mBS can have its own subscriber information from a SIM card or other identity module. As a result, the mBS can function as a home network eNB for several UEs traveling together. The mBS would be visible as a single roaming unit to the visitor network. For example, the mBS can act like a router for packet data communications without end-to-end connection between the UEs and the home network, such as for billing. The mBS can also act as a local router among UEs, if the UEs are under its coverage and no core network is needed for packet exchange.

When a mBS is roaming across a country or other regulatory border, the roaming is enabled by configuring the mBS proactively on-the-fly by using proximity information and Software Defined Radio (SDR) properties of the mBS. The configuration information can be obtained from the home network or from the visiting network after moving to the neighboring region. The home and visitor networks would negotiate a new SDR configuration via backhaul network or over-the-air. In an embodiment, the new operational parameters could be a new operating frequency, such as a different Long Term Evolution (LTE) band. The mBS is capable of adapting SDR configurations by using an adaptive mode change.

Figure 1:
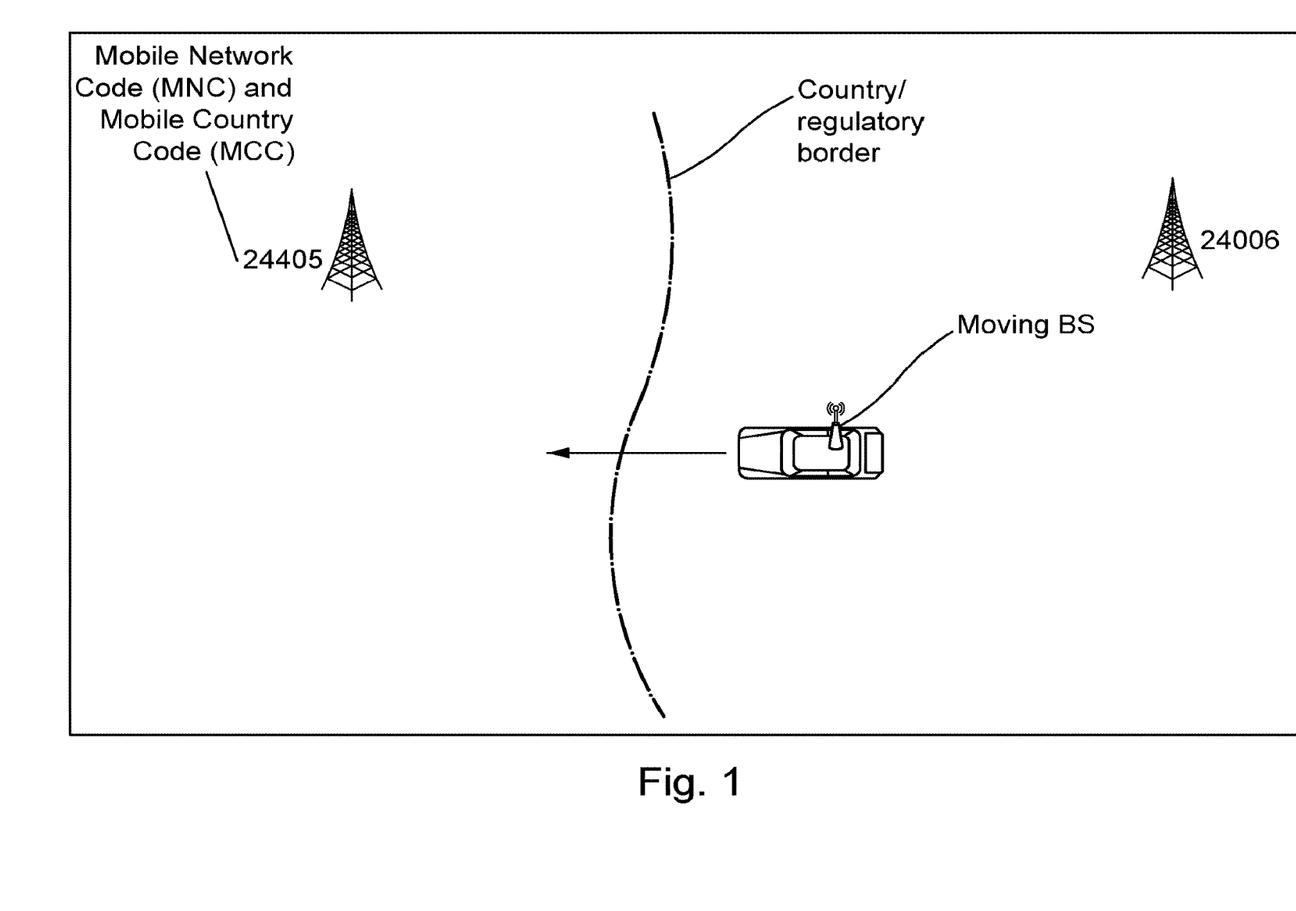
FIG. 1 illustrates a vehicle with an onboard mobile base station according to embodiments of the invention.

FIG. 1 illustrates a vehicle with a mBS. The operation mode of the mBS is selected based upon the mBS's current location and/or mobility mode. In this example, the vehicle is approaching a country border or other regulatory border, in which a full base station functionality may not be able to be utilized. A full base station mode can still be used near a border. This will depend on an agreement between the associated operators, regulation policy, etc. However, when the mBS is inside the other country or regulatory area, a "foreign" base station cannot normally be used. The mBS can then change modes to be compatible in the new area and receive new SDR parameters from the new network, or the mBS can change to a relay mode. New SDR configurations may not be necessary if the boundary is not a country border or there is no visitor network. In an alternative embodiment, the full base station mode can be allowed by the network, when the network determines that such a mode is feasible. In another embodiment, the mBS could operate as a full base station while in the home network; it could switch to an AF relay mode while within the border; and the mBS could switch to a type-2 relay once inside the visitor network.

In the FIG. 1 example, the mBS can switch its mode to act as a limited base station when approaching the border or just after crossing the border, when it is not possible to act at a full base station functionality. Examples of a limited base station include, but are not limited to, an amplify-forward relay node, a decode-forward relay node, a diversity-providing relay node, a remote radio head, or a macro base station assisted or controller small cell. In some embodiments, the location of the mBS can be predicted, such as a moving trajectory along a road. The mBS receives the correct operational parameters from the network, with mutual agreement between the home network and the visitor network. The mBS can also act as a roaming local low-power eNB.

The example of FIG. 1 illustrates crossing the border of a country. However, a country border crossing is just one example in which embodiments of the invention could be utilized. Other examples of crossing a communications border include, but are not limited to state or territory border crossings, crossing a regulatory border, crossing from one commercial coverage area into another commercial coverage area, or any instance of leaving a designated home network and entering into another network, such as a visitor network. Other examples are contemplated by embodiments of the invention.

In the example of FIG. 1 above, the roaming of a base station is enabled by configuring the base station proactively on-the-fly by using proximity information and SDR properties of the base station. The configuration information is obtained from the home network or from the visiting network after moving to the neighboring region. The home and visitor networks negotiate a new SDR configuration, which could be a different LTE band. There can also be a pre-defined communication channel for this purpose between operators or pre-defined in specifications, or an existing communication channel can be used with new Information Elements (IE).

A server or node in the network side maintains a database with the needed SDR setting for the different supported radio transmission modes. If configuration of the new operation mode fails, the mBS switches itself to a relay mode. In an embodiment, this may comprise amplifying the signal it receives from the normal base station or UE. If the configuration is successful, the mBS will still be in the relay mode if other conditions are not fulfilled, such as a stationary or roaming condition.

Since a moving base station can create severe interference problems and network planning issues, an embodiment uses the full base station functionality only for a stationary mBS, especially when operating outside of its home network. In an alternative embodiment, the full base station mode can be allowed by the network, when the network determines that such a mode is feasible.

The network can provide routes where eNB functionality is allowed. As an example, the network can tell in which part of a highway the vehicle is driving, and therefore, which part of the highway that functionality is allowed. The system can also utilize a vehicle's navigation system and automatically switch to a relay mode when appropriate.

Figure 2:
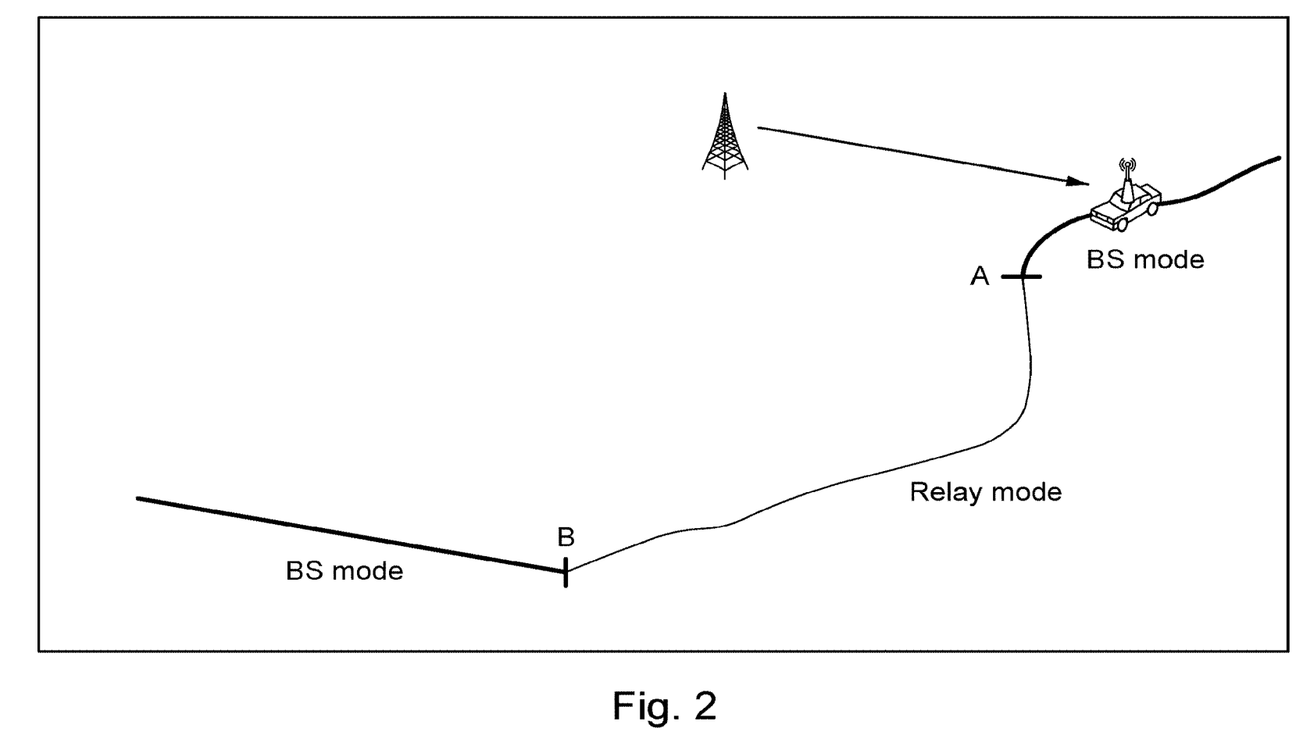
FIG. 2 illustrates an implementation of mode switching for a mobile base station according to embodiments of the invention.

FIG. 2 illustrates an implementation of mode switching for a mBS. Before point A, the network has allowed the mBS to act as a local base station. At point A, the mBS needs to switch to relay mode. At point B, the mBS can switch back to full base station mode. The mode commands can be given in advance by the network and stored by the vehicle mBS, or they can be given over the air before the possible switching point approaches. In either case, at least the mode switch command to the full base station mode may need to be confirmed by the network. It is also possible for the network to give other transmission parameters that depend on the mBS position, or depend on time. In an embodiment, lower transmission powers may be used on some part of the route.

In a roaming scenario, a mBS approaching a border, such as a regulatory, territory, commercial, network, or other communications border, can be detected via UE or base station measurements and base station signaling. One way in which the eNB can detect that it is close to a regulatory border is through a Network Listening Mode (NLM) of the base station. The base station can measure neighboring cells itself or through connected UEs. With these measurements, cells and their IDs can be identified. Another way to detect a close regulatory border is receiving an indication from the home network. Another way to detect a close regulatory border is by utilizing GPS or other positioning based technology at the eNB or its connected UEs. Yet another way of detecting a close-approaching regulatory border is for the UE to report to its own eNB about the potential of entering a neighboring region.

According to an embodiment, when a mBS enters an area where there is a high probability of having a roaming situation, the mBS queries a database in the network, which is located for example, in a server in the core part of the radio network or being operated by a third party. The mBS may also signal its radio and subscription capabilities. The network replies with information about possible radio operation modes (SDR configuration) in the new area. The mBS can accept some of the supported modes and ask for configuration in the new area. The mBS can then accept some of the supported modes and ask for configuration of those modes. The network replies with SDR configuration settings for the new transmission mode. Some or all of the configuration settings can already be stored in the mBS, in which case, the network just sends the missing parts. The mBS acknowledges the reception of settings and starts preparing for new configuration for the roaming area. In an embodiment, one or more UEs may roam outside of the mBS coverage area. As an example, a mBS may reside in a moving vehicle. When the vehicle stops, one or more UEs may move away from the mBS coverage area, which served as their home network, into a different area, such as a visitor network.

An example will be given to illustrate an embodiment of the invention. Embodiments of the invention are not limited to this example. When a mBS crosses the border between a first country to a second country, such as in a vehicle, the mBS functionality is turned off. The firmware and/or software are updated via SDR configurations to transition to the second country base station. This transition can be prepared and negotiated beforehand. For instance, the second country mode could be fully configured in the background while still located in the first country. When the mBS crosses the border, the mBS would be switched to the second country mode. A change to a relay mode does not incur regulatory problems. A mode change to a very low power local node to operate in a foreign country will usually not cause interference problems.

Figure 3:
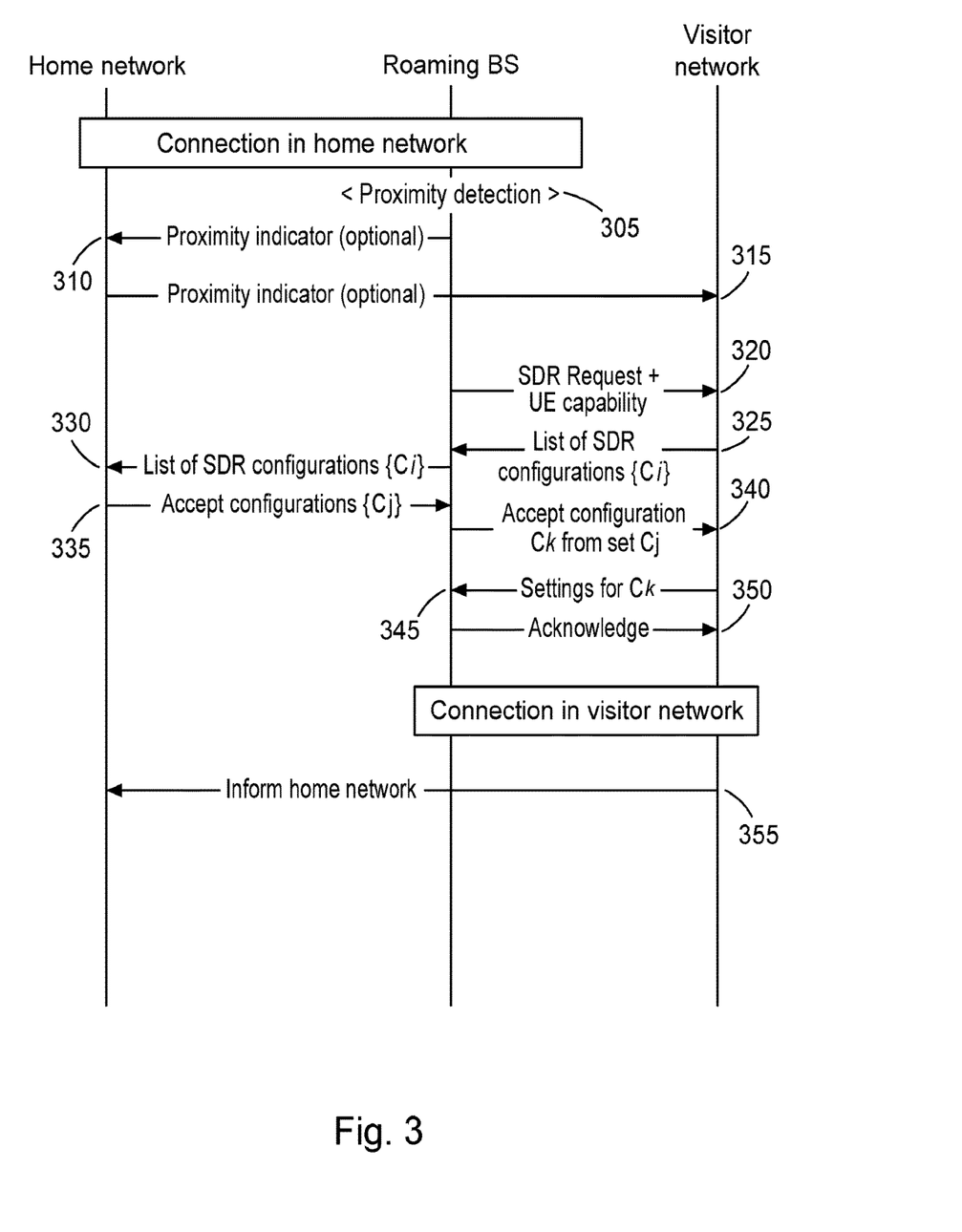
FIG. 3 is a signaling diagram of a mobile base station approaching a regulatory border according to embodiments of the invention.

FIG. 3 illustrates an example of an embodiment of a signaling diagram in which a roaming base station, or mBS is approaching a regulatory border. In the example of FIG. 3, the mBS is initially connected to its home network. Proximity information is detected in step 305. A proximity indicator can be sent from the mBS to the home network in step 310, and also from the home network to the visitor network in step 315. An SDR request and UE capability is sent from the mBS to the visitor network in step 320. A list of SDR configurations are sent back from the visitor network to the mBS in step 325. The mBS sends that list of SDR configurations to the home network in step 330. The configurations are accepted by the home network in step 335, and are accepted by the mBS in step 340. The settings for those configurations are sent from the visitor network to the mBS in step 345. The settings are acknowledged by the mBS to the visitor network in step 350. At this point, the mBS is connected to the visitor network. The visitor network informs the home network of the connection in step 355.

Figure 4A:
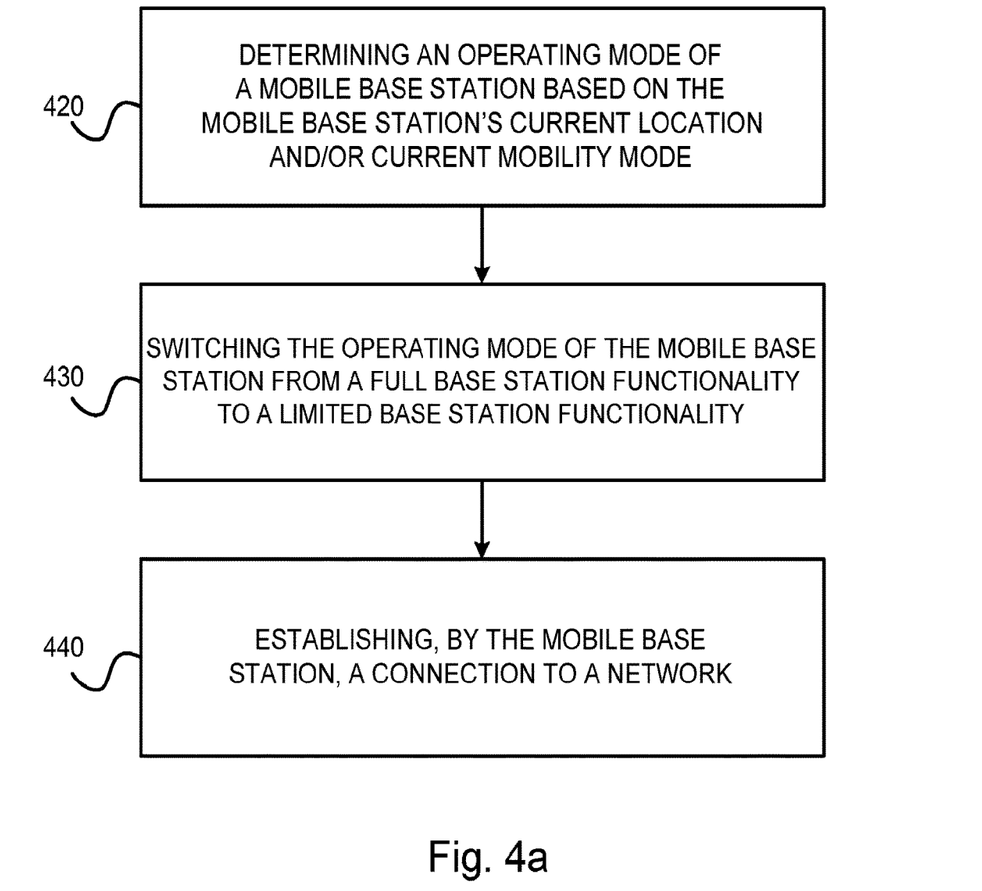
FIG. 4a is a flowchart of a method according to embodiments of the invention.

FIG. 4a is a flowchart of a method according to embodiments of the invention. An operating mode of a mobile base station is determined, based upon the mobile base station's current location and/or current mobility mode in step 420. A near-approaching border is detected, via a proximity detection mechanism, by a mBS in a home network. The proximity detection mechanism may be located within a moving vehicle, for example. The proximity detection mechanism may comprise one or more of network listening mode, global positioning system, home network indication, or user equipment mobility information. The near-approaching border may include, but is not limited to a country, state, or territory border, a regulatory border, a commercial coverage border, a transition from a home network to a visitor network, or other communications border.

The operating mode of the mobile base station is switched from a full base station functionality to a limited base station functionality, based upon the determining, in step 430. Examples of a limited base station include, but are not limited to, an amplify-forward relay node, a decode-forward relay node, a diversity-providing relay node, a remote radio head, or a macro base station assisted or controller small cell. A connection to a network is established by the mobile base station in step 440. The network may comprise a visitor network, as an example. The detecting may comprise configuring the mobile base station on-the-fly, via the proximity detection mechanism and software defined radio properties of the mobile base station. Information for the configuring is obtained from either the home network or from the visitor network.

Operational parameters in the relay mode functionality are received via a mutual agreement between the home network and the visitor network. Communications may be transmitted via the mobile base station with one or more user equipments. The mobile base station may comprise a roaming network that is visible to the visitor network as a single roaming unit. For example, the mBS can act like a router for packet data communications without end-to-end connection between the UEs and the home network, such as for billing. The mBS can also act as a local router among UEs, if the UEs are under its coverage and no core network is needed for packet exchange. The operating mode of the mobile base station can be changed back to a full base station mode, subsequent to crossing over the near-approaching border.

Figure 4B:
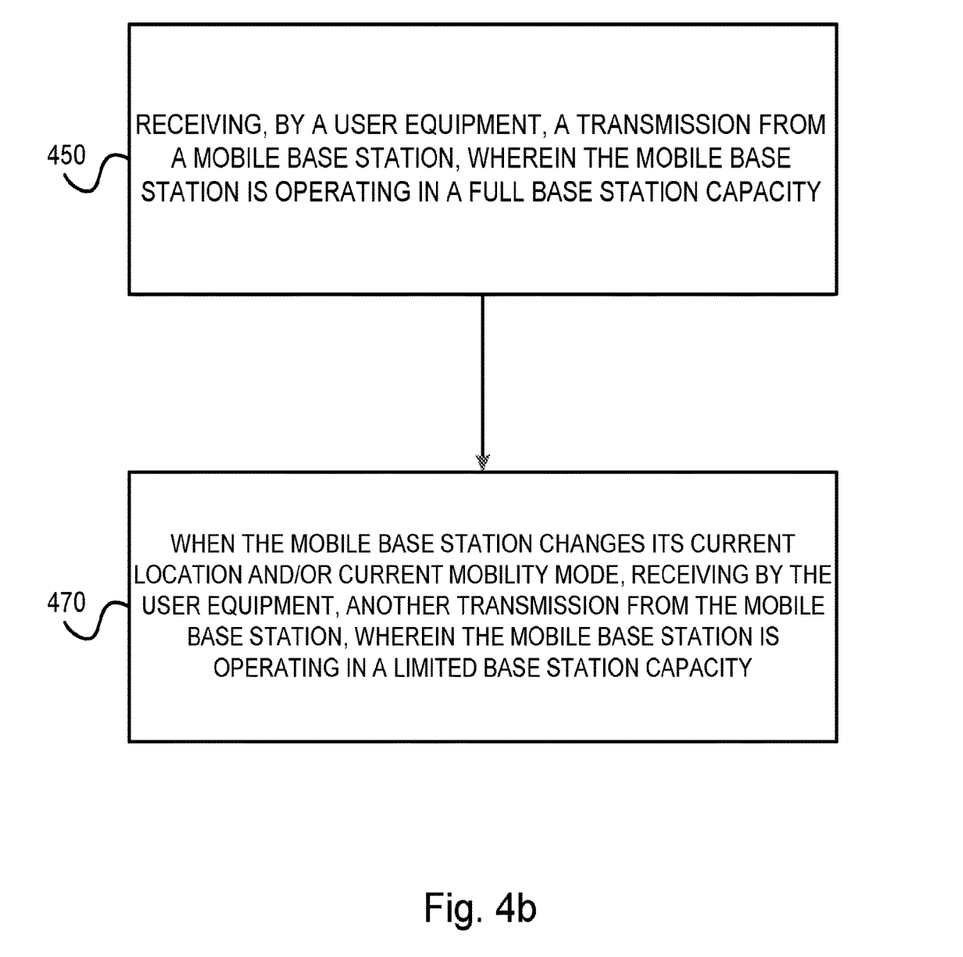
FIG. 4b is a flowchart of a method according to embodiments of the invention.

FIG. 4b is a flowchart of another method according to embodiments of the invention. A transmission is received by a user equipment from a mobile base station in step 450, wherein the mobile base station is operating in a full base station capacity. When the mBS changes its current location and/or current mobility mode, another transmission is received by the user equipment from the mobile base station in step 470, wherein the mobile base station is operating in a limited base station capacity. The receiving another transmission includes operational parameters in the limited base station capacity, via a mutual agreement between a home network and a visitor network of the mobile base station.

Figure 5A:
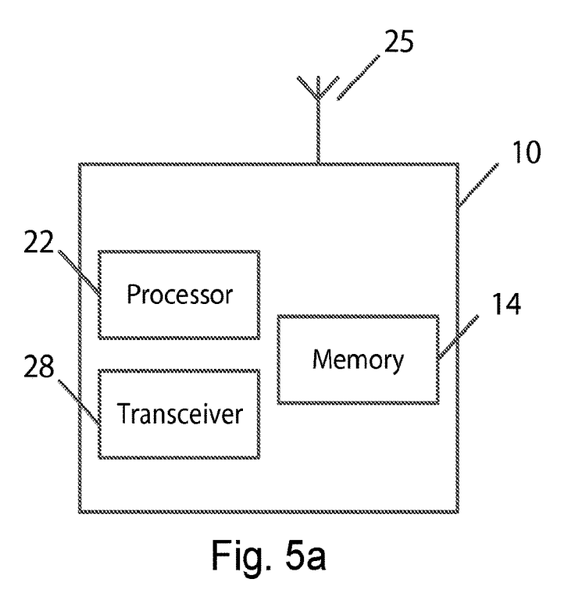
FIG. 5a illustrates an example of an apparatus according to embodiments of the invention.

FIG. 5a illustrates an example of an apparatus 10 according to an embodiment. In one embodiment, apparatus 10 may be a UE. It should be noted that one of ordinary skill in the art would understand that apparatus 10 may include components or features not shown in FIG. 5a. Only those components or features necessary for illustration of the invention are depicted in FIG. 5a.

As illustrated in FIG. 5a, apparatus 10 includes a processor 22 for processing information and executing instructions or operations. Processor 22 may be any type of general or specific purpose processor. While a single processor 22 is shown in FIG. 5a, multiple processors may be utilized according to other embodiments. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 10 further includes a memory 14, which may be coupled to processor 22, for storing information and instructions that may be executed by processor 22. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 14 can be comprised of any combination of random access memory (RAM), read only memory (ROM), static storage such as a magnetic or optical disk, or any other type of non-transitory machine or computer readable media. The instructions stored in memory 14 may include program instructions or computer program code that, when executed by processor 22, enable the apparatus 10 to perform tasks as described herein.

Apparatus 10 may also include one or more antennas 25 for transmitting and receiving signals and/or data to and from apparatus 10. Apparatus 10 may further include a transceiver 28 configured to transmit and receive information. For instance, transceiver 28 may be configured to modulate information onto a carrier waveform for transmission by the antenna(s) 25, and to demodulate information received via the antenna(s) 25 for further processing by other elements of apparatus 10. In other embodiments, transceiver 28 may be capable of transmitting and receiving signals or data directly.

Processor 22 may perform functions associated with the operation of apparatus 10 including, without limitation, precoding of antenna gain/phase parameters, encoding and decoding of individual bits forming a communication message, formatting of information, and overall control of the apparatus 10, including processes related to management of communication resources.

In an embodiment, memory 14 stores software modules that provide functionality when executed by processor 22. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

In an embodiment, apparatus 10 may be a UE, such as the UE discussed with regard to FIG. 4b. In this embodiment, the UE 10 receives a transmission from a mBS, wherein the mBS is operating in a full base station capacity. When the mBS moves across a border, the UE 10 receives another transmission from the mBS, wherein the mBS is operating in a limited base station capacity. Examples of a border include, but are not limited to a country, state, or territory border, a regulatory border, a commercial coverage border, a transition from one network to another network, or other communications border.

Figure 5B:
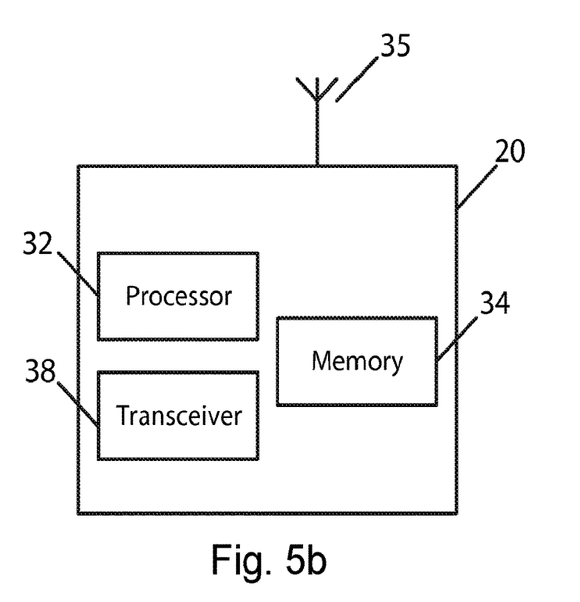
FIG. 5b illustrates an example of an apparatus according to embodiments of the invention.

FIG. 5b illustrates an example of an apparatus 20 according to another embodiment. In an embodiment, apparatus 20 may be a network node, such as a base station or eNB. It should be noted that one of ordinary skill in the art would understand that apparatus 20 may include components or features not shown in FIG. 5b. Only those components or feature necessary for illustration of the invention are depicted in FIG. 5b.

As illustrated in FIG. 5b, apparatus 20 includes a processor 32 for processing information and executing instructions or operations. Processor 32 may be any type of general or specific purpose processor. While a single processor 32 is shown in FIG. 5b, multiple processors may be utilized according to other embodiments. In fact, processor 32 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 20 further includes a memory 34, which may be coupled to processor 32, for storing information and instructions that may be executed by processor 32. Memory 34 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 34 can be comprised of any combination of random access memory (RAM), read only memory (ROM), static storage such as a magnetic or optical disk, or any other type of non-transitory machine or computer readable media. The instructions stored in memory 34 may include program instructions or computer program code that, when executed by processor 32, enable the apparatus 20 to perform tasks as described herein.

Apparatus 20 may also include one or more antennas 35 for transmitting and receiving signals and/or data to and from apparatus 20. Apparatus 20 may further include a transceiver 38 configured to transmit and receive information. For instance, transceiver 38 may be configured to modulate information onto a carrier waveform for transmission by the antenna(s) 35, and to demodulate information received via the antenna(s) 35 for further processing by other elements of apparatus 20. In other embodiments, transceiver 38 may be capable of transmitting and receiving signals or data directly.

Processor 32 may perform functions associated with the operation of apparatus 20 including, without limitation, precoding of antenna gain/phase parameters, encoding and decoding of individual bits forming a communication message, formatting of information, and overall control of the apparatus 20, including processes related to management of communication resources.

In an embodiment, memory 34 stores software modules that provide functionality when executed by processor 32. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

As mentioned above, according to an embodiment, apparatus 20 may be a base station, such as an eNB. In another embodiment, apparatus 20 may be a mobile base station, such as the mBS's illustrated in FIGS. 1-2 and discussed in FIG. 4a. In FIG. 4a, the mBS 20 is in a home network, when it detects a near-approaching border, via a proximity detection mechanism. An operating mode of the mBS 20 is switched from a full base station functionality to a limited base station functionality. A connection to a network is established by the mBS 20.

Embodiments of the invention provide several advantages. A better user experience is provided for a traveler via a base station that moves or roams with the traveler. This is provided both inside and outside of the user's country, state, or territory, or other regulatory region. As an example, a personal home base station can be brought across a regulatory border and used within the visitor's region. Another advantage is reduced roaming costs, wherein several UE's can use their home base station without each of the UE's incurring roaming costs. There would usually be just a single roaming cost for the base station. Another advantage provides seamless connections while crossing regulatory borders.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. An apparatus, comprising:
   at least one processor; and
   at least one memory comprising computer program code,
   the at least one memory and the computer program code configured, with the at least one processor, to cause the apparatus, at least to:
   detect in a home network, a near-approaching border, via a proximity detection mechanism;
   transmit a proximity indicator to the home network;
   determine an operating mode based on the detection and/or a current mobility mode;
   switch the operating mode from a full base station functionality to a limited base station functionality based on the determining of an operating mode; and
   establish a connection to a visitor network,
   wherein the limited base station functionality comprises a relay mode.

2. The apparatus of claim 1, wherein the relay mode comprises one of an amplify-forward relay node, a decode-forward relay node, or a diversity-providing relay node.

3. The apparatus of claim 2, wherein the near-approaching border comprises one of a regulatory, territory, or commercial border.

4. The apparatus according to claim 3, wherein the detecting further comprises: configure the apparatus on-the-fly, via the proximity detection mechanism and software defined radio properties of the apparatus.

5. The apparatus according to claim 4, wherein information from the configuring is obtained from the home network or from the visitor network.

6. The apparatus according to claim 4, wherein the proximity detection mechanism comprises one or more of network listening mode, network assistance, global positioning system (GPS), or user equipment mobility information.

7. The apparatus according to claim 1, further comprising, to cause the apparatus, at least to: receive operational parameters in the limited base station functionality, via a mutual agreement between the home network and the visitor network.

8. The apparatus according to claim 1, wherein the apparatus comprises a roaming network.

9. The apparatus according to claim 8, wherein the roaming network is visible to the visitor network as a single roaming unit.

10. The apparatus according to claim 1, wherein the apparatus comprises a mobile base station.

11. A method, comprising:
   detecting in a home network, a near-approaching border, via a proximity detection mechanism;
   transmitting a proximity indicator to the home network;
   determining an operating mode of a mobile base station based on the detecting and/or current mobility mode;
   switching the operating mode of the mobile base station from a full base station functionality to a limited base station functionality based on the determining of the operating mode; and
   establishing, by the mobile base station, a connection to a visitor network,
   wherein the limited base station functionality comprises a relay mode.

12. The method according to claim 11, wherein the near-approaching border comprises one of a regulatory, territory, or commercial border.

13. The method according to claim 11, wherein the detecting further comprises: configure the apparatus on-the-fly, via the proximity detection mechanism and software defined radio properties of the apparatus.

14. The method according to claim 13, wherein information from the configuring is obtained from the home network or from the visitor network.

15. The method according to claim 11, wherein the proximity detection mechanism comprises one or more of network listening mode, network assistance, global positioning system (GPS), or user equipment mobility information.

16. The method according to claim 11, further comprising receiving operational parameters in the limited base station functionality, via a mutual agreement between the home network and the visitor network.

17. The method according to claim 11, wherein the method is performed in a roaming network.

18. The method according to claim 17, wherein the roaming network is visible to the visitor network as a single roaming unit.

19. The method according to claim 11, wherein the method is performed by a mobile base station.

20. A non-transitory computer readable medium comprising program instructions stored thereon for performing a process, comprising:
   detecting in a home network, a near-approaching border, via a proximity detection mechanism;
   transmitting a proximity indicator to the home network;
   determining an operating mode of a mobile base station based on the detecting and/or current mobility mode;
   switching the operating mode of the mobile base station from a full base station functionality to a limited base station functionality based on the determining of the operating mode; and
   establishing, by the mobile base station, a connection to a visitor network,
   wherein the limited base station functionality comprises a relay mode.

* * * * *